Dec. 21, 1954  J. C. SETECKA  2,697,353
MEASURING RECEPTACLE
Filed April 9, 1952
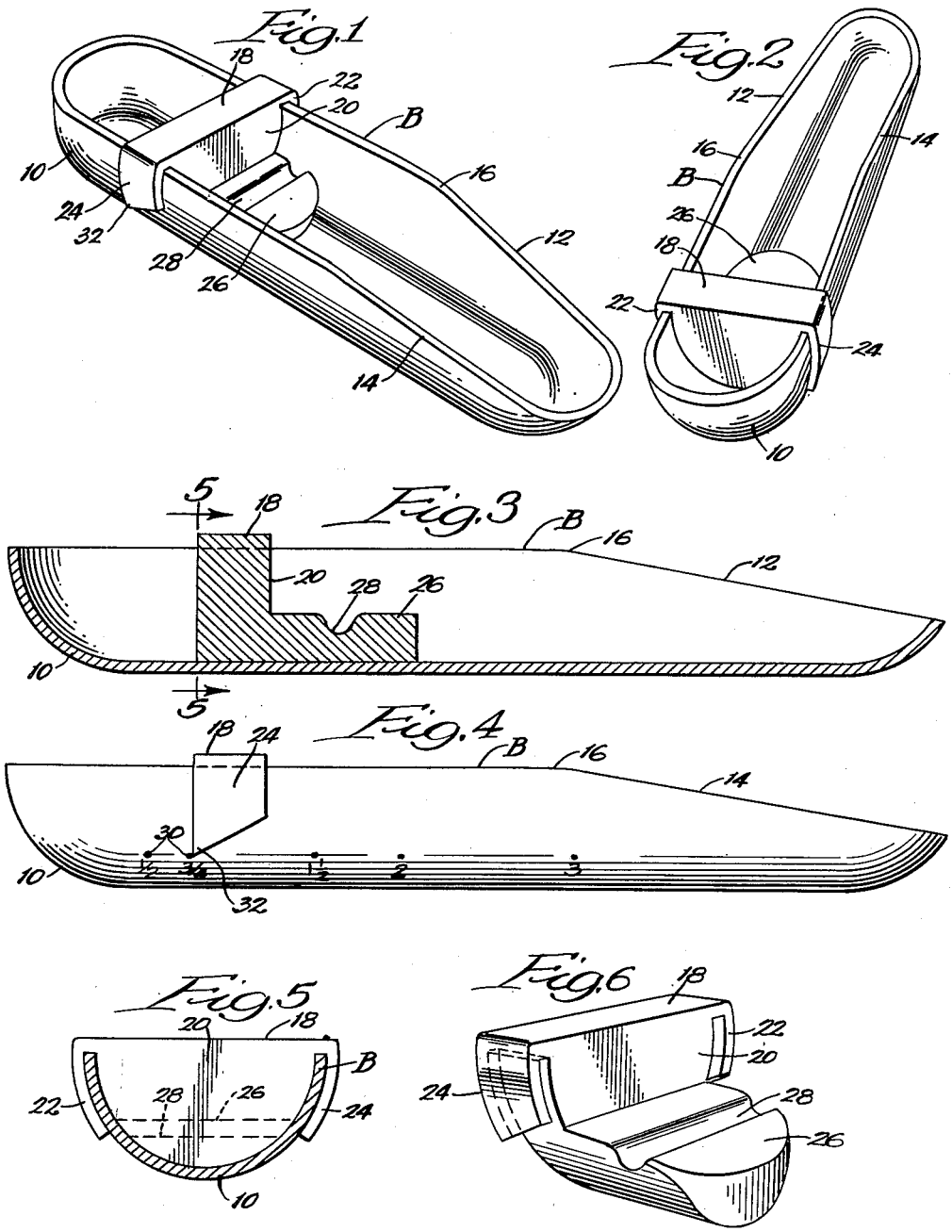
INVENTOR:
John C. Setecka,
BY
Dawson & Ooms,
ATTORNEYS.

2,697,353

MEASURING RECEPTACLE

John C. Setecka, Chicago, Ill.

Application April 9, 1952, Serial No. 281,397

2 Claims. (Cl. 73—429)

This invention relates to a measuring device and more particularly relates to a unitary measuring receptacle which is adaptable to varying quantities of materials which may be measured accurately.

Measuring devices presently being used by the housewife and the like, consist of numerous spoons, each spoon having a definite quantitative limitation into which any liquid or solid material may be placed. There have been some measuring devices which have attempted to incorporate into one device the varying quantitative amounts needed in measuring devices for cooking and the like. These devices have been unsuccessful because of the complicated mechanism and because suitable cooperation between elements was not achieved to permit the measuring device to be used by both liquids and solids as well as to permit ready disassembly of the device for purposes of cleaning.

The obvious advantage of providing a measuring device which is capable of measuring different quantities is apparent. The housewife need not carry a large number of measuring spoons and additionally, the use of one measuring device will expedite the work usually found in cooking.

It is therefore a general object of this invention to provide a single measuring device which is capable of measuring variable quantities accurately.

Another object of this invention is to provide a single measuring device comprising several relatively simple elements which are inexpensive to manufacture and which cooperate in a novel manner to permit fast and accurate measuring of varying quantities of materials.

Another object of this invention is the provision of a single measuring device which is capable of measuring liquid as well as solid materials.

Still another object of this invention is to provide a single measuring device which can be readily assembled and disassembled for cleaning purposes.

For the purpose of illustration, certain embodiments of my invention are shown in the accompanying drawings, in which—

Fig. 1 is a perspective view of my new adjustable measuring device;

Fig. 2 is another perspective view of my adjustable measuring device;

Fig. 3 is a side elevation view in cross section of my adjustable measuring device;

Fig. 4 is a side elevational view of the exterior of my adjustable measuring device;

Fig. 5 is a cross-sectional view taken on line 5—5 of Fig. 3 of my adjustable measuring device.

Fig. 6 is a perspective view of the stopper of my device.

Referring to the drawings in detail, my adjustable measuring receptacle is generally indicated by the letter B and comprises a hollow trough-shaped receptacle 10 having its side walls 12 and 14 tapering downwardly at 16 and terminating approximately half way above the plane of the bottom of the receptacle. This permits the ready and easy removal of the damming element of my adjustable measuring device as will be described more fully hereafter.

Mounted slidably and detachably with the receptacle 10 is a stopper 18. The stopper 18 has a forwardly-presented damming wall 20 which is so shaped as to fit the interior contour of the receptacle 10. The receptacle 10 and the stopper element 18 are preferably made of plastic material, since it has been found that the coaction between plastic material gives greater qualities of adhesion than is found with metals or other materials. The damming wall 20 may be of any desired width but it has been found that a width of a quarter inch (¼") or the like insures a water-tight fit in the event that the measuring device is used to measure water or other liquids.

Mounted atop the damming wall 20 and extending out from the wall are a pair of flanges 22 and 24. The guide flanges may be an integral part of the stopper 18 as shown in Fig. 6 of the drawings. The guide flanges 22 and 24 are shaped to correspond with the outer contour of the receptacle 10 and serve to embrace a portion of the receptacle to permit positive and easy relative movement of the stopper 18 in the receptacle 10 by riding on the upper edges of the receptacle 10.

Since the damming wall 18 is molded to conform to the inner contour of the receptacle 10, there is a close fit between these elements which is insured by the guide flanges 22 and 24 which tend to pull the portion of the receptacle 10 towards the damming wall 20 to insure a tight fit. Thus it has been found that my measuring device can easily and safely be used with liquids as well as solid materials.

A flange 26 is attached rearwardly from the wall 20 of the stopper 18. The flange 26 may be provided with a transverse groove 28 to permit a gripping area when the stopper is manipulated. It has been found that when the flange 26 rests on the bottom of the receptacle and is shaped to conform to the contour of the receptacle, as shown in the drawings, that easier relative movement of the stopper is obtained. The flange 26 will also provide additional surface area to insure water-tightness of the wall 20. As shown in Fig. 6 of the drawing, the stopper element, which includes guide flanges 22 and 24 as well as the flange 26, may be molded in one piece. This, of course, greatly lessens the cost of my measuring device.

The exterior of the receptacle 10 is marked with indices 30 which are commensurate with the quantitative amounts of the receptacle when the damming wall 20 of the stopper 18 is in line with the particular index. To facilitate determining the measurement desired, the guide flanges 22 and 24 may terminate in a point 32. Thus the user may select the quantity of the contents of the measuring device by merely setting the flange at the appropriately marked index, as shown in Fig. 4, which reads ¾ teaspoon.

My measuring device can be readily disassembled by merely grasping the flange 26 by the gripper element 28 and pulling rearwardly. Because the walls 12 and 14 of the receptacle 10 are tapered downwardly, the flanges 22 and 24 of the stopper 18 become disengaged from the walls of the receptacle 10. The removal is also facilitated by the fact that the flange 26 of the stopper 18 rides up the bottom of the receptacle 10 at its rearwardmost portion and the stopper 18 is gently slanted upward and out. The measuring device can then easily be cleaned by rinsing the receptacle 10 and the stopper 18. To assemble the measuring device, all that is required is that the flanges 22 and 24 encompass the walls 12 and 14 of the receptacle 10. The stopper 18 is then pushed forward where the flanges then engage the walls of the receptacle 10 to guide the stopper within the receptacle 10.

It is to be seen that my measuring device comprises relatively simply arranged elements, but these elements all cooperate with each other to provide a new and efficient measuring device which is easily adjusted to the desired quantity of contents to be measured. Because there are only two elements to my measuring device, it is inexpensive to manufacture and construct.

While I have shown a preferred form of my invention for the purpose of illustration, it will be apparent to those skilled in the art that the details set forth can be varied widely without departing from the spirit of my invention.

I claim:

1. An adjustable measuring device for domestic use comprising a hollow trough-shaped receptacle and a slidably detachable stopper mounted in said receptacle; said receptacle being closed at one end and substantially open at the opposite end, said stopper having a damming wall facing the closed end and corresponding to the inner cross-sectional contour of the inner receptacle, guide flanges attached to said damming wall corresponding in shape to the contour of the outside of said receptacle to enclose a portion of said receptacle, there being indicia on the side of the receptacle, and a rearwardly extending element attached to the bottom of said damming wall to permit manipulation of said stopper in said receptacle whereby the wall may be positioned in alignment with the indicia to provide the desired capacity between the wall and the closed end.

2. An adjustable measuring device for domestic use comprising a hollow trough-shaped receptacle and a slidably detachable stopper mounted within the receptacle; the receptacle being closed at its forward end and having rearwardly tapering walls from a point substantially back of the forward end to form a substantially open end at the opposite end, the stopper having a forwardly disposed damming wall corresponding to the inner cross-sectional contour of the receptacle, guide flanges attached to either side of the damming wall corresponding in shape to the outside of the receptacle and adapted to enclose a portion of the receptacle to hold the two parts together while permitting longitudinal movement of the stopper along the length of the receptacle, there being indicia on the side of the receptacle, and a rearwardly extending flange having its bottom corresponding to the cross-sectional contour of the receptacle integrally attached to the bottom of the damming wall to permit longitudinal movement of the stopper to align with the indicia to measure various quantities of material between the wall and the closed end as well as removal of the stopper from the receptacle.

References Cited in the file of this patent

UNITED STATES PATENTS

| Number | Name | Date |
|---|---|---|
| 993,560 | Skyum | May 30, 1911 |
| 2,175,747 | Dodd | Oct. 10, 1939 |
| 2,389,530 | Miner | Nov. 20, 1945 |
| 2,569,703 | Weiland | Oct. 2, 1951 |